United States Patent [19]

Patton, Jr. et al.

[11] 4,210,728
[45] Jul. 1, 1980

[54] PREPARATION OF HIGH RESILIENCY POLYURETHANE FOAMS

[75] Inventors: John T. Patton, Jr., Wyandotte; Robert L. McBrayer, Lincoln Park, both of Mich.

[73] Assignee: BASF Wyandotte Corporation, Wyandotte, Mich.

[21] Appl. No.: 866,296

[22] Filed: Jan. 3, 1978

[51] Int. Cl.$^2$ .............. C08G 18/14; C08G 18/32; C08G 18/63

[52] U.S. Cl. .............. 521/160; 252/182; 521/137; 521/163; 521/176; 521/904; 528/64; 528/75

[58] Field of Search .............. 521/904, 137, 163, 176, 521/51, 160; 252/182; 528/64, 76

[56] References Cited

U.S. PATENT DOCUMENTS

| | | | |
|---|---|---|---|
| 3,194,793 | 7/1965 | Kogon | 528/64 |
| 3,428,610 | 2/1969 | Klebert | 528/64 |
| 3,586,649 | 6/1971 | Cobbledick | 521/163 |
| 3,591,560 | 7/1971 | Wagner et al. | 260/77.5 |
| 3,849,360 | 11/1974 | Farah et al. | 528/64 |
| 4,048,102 | 9/1977 | Quock et al. | 521/163 |
| 4,136,241 | 1/1979 | Ammann | 521/163 |

Primary Examiner—H. S. Cockeram
Attorney, Agent, or Firm—Joseph D. Michaels

[57] ABSTRACT

A reactive polyol composition useful in the preparation of high resilient polyurethane foams comprising a polyol and from 0.5% by weight to 5.0% by weight of a reactive diamine represented by the following formula:

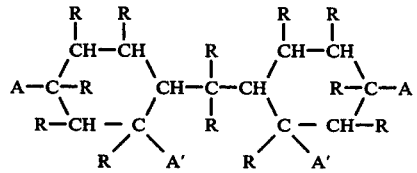

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H.

12 Claims, No Drawings

PREPARATION OF HIGH RESILIENCY POLYURETHANE FOAMS

BACKGROUND OF THE INVENTION

The invention relates to the preparation of reactive polyol compositions and to the use of these compositions in the preparation of high resiliency polyurethane foams. Particularly the invention relates to the preparation of reactive polyol compositions comprising a polyol and from 0.5% to 5.0% by weight of a reactive diamine.

PRIOR ART

The preparation of high resiliency polyurethane foams characterized by high strength and load bearing properties by the reaction of an organic polyisocyanate with a polyol in the presence of a cross-linking agent is well known in the art. The most commonly used cross-linking agents are hindered or negatively-substituted aromatic diamines such as 4,4'-methylene-bis(2-chloroaniline). These diamines which offer the advantage of reactivity rates more equal to that of hydroxyl groups have recently been suspected to be carcinogenic and their use in the preparation of polyurethanes has been all but eliminated. To a lesser extent, unhindered aromatic diamines such as 4,4'-methylene-dianiline have been used in the art. However, these amines are so reactive with isocyanate groups resulting in the formation of insoluble polyureas before the urethane formation occurs that the preparation of polyurethanes therefrom is almost impossible. More recently, the use of aminocyclohexylmethanamines as cross-linking agents is described in U.S. Pat. No. 4,048,102.

In the preparation of high resiliency slab-stock polyurethane foams, toluene diisocyanate is the organic polyisocyanate of choice since its use results in foams of best overall properties. Unfortunately, however, the reaction rate required to obtain these foams is such that absent a cross-linking agent, it has been almost impossible to employ toluene diisocyanate as the sole organic polyisocyanate.

The present invention is directed to novel reactive compositions which when employed in the preparation of polyurethane foams provides foams of improved load bearing, strength and humid-aging properties. The present invention is also directed to the preparation of slab-stock polyurethane foams employing these novel compositions.

SUMMARY OF THE INVENTION

The present invention relates to compositions comprising (a) a polyol having an equivalent weight of from 500 to 5000 and a functionality of from 2 to 4, and (b) from 0.5% to 5.0% by weight based on the weight of the polyol of a reactive diamine having the following formula:

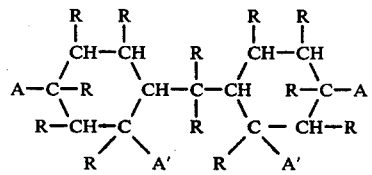

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H.

DESCRIPTION OF THE PREFERRED EMBODIMENTS

As mentioned above, there are two ingredients which comprise the compositions of the subject invention: a polyol and certain reactive alicyclic diamines. The polyols which may be employed in the subject invention will generally have an equivalent weight of from 500 to 5000 and a functionality of from 2 to 4. Suitable compounds include hydroxyl-terminated polyesters, polyoxyalkylenepolyether polyols, and alkylene oxide adducts of organic compounds having at least 2 reactive hydrogen atoms such as amines, acids of phosphorus, dithiols, etc.

Any suitable hydroxy-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethylglutaric acid, α,β-diethylsuccinic acid, phthalic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, 1,3-propanediol, 1,2-propylene glycol, 1,4-butanediol, 1,3-butanediol, 1,2-butylene glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenolic compounds such as 2,2-bis(4-hydroxyphenyl)-propane, commonly known as Bisphenol A and hydroxyalkyl ethers of such phenolic compounds such as bis-2-hydroxyethyl ether of hydroxyquinone.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Any suitable polyoxyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia Of Chemical Technology*, Vol. 7, pp. 257-262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxy-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Any suitable polyamine may be used including aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propylenediamine; 1,4-butylenediamine, and 1,3-butylenediamine, as well as substituted secondary derivatives thereof.

In addition to the above hydroxy-containing compounds, other compounds which may be employed include graft polyols. These polyols are prepared by the in situ polymerization product of a vinyl monomer or monomers in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639; and 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541; and 3,639,542.

The reactive diamines of use in the invention are represented by the formula:

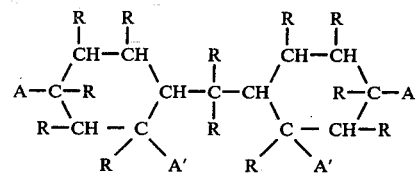

wherein R is H or alkyl of 1 to 4 carbon atoms and A and A' are $NH_2$ or H with the provisos that in each ring either A or A' is $NH_2$, not both and when A or A' is $NH_2$ then the R attached to that carbon atom is H. Representative amines include:

bis(4-aminocyclohexyl)methane
bis(4-amino-3-methylcyclohexyl)methane
bis(4-amino-3,5-dimethylcyclohexyl)methane
bis(4-amino-2,3,5-trimethylcyclohexyl)methane
1,1-bis(4-aminocyclohexyl)propane
2,2-bis(4-aminocyclohexyl)propane
1,1-bis(4-aminocyclohexyl)ethane
1,1-bis(4-aminocyclohexyl)butane
2,2-bis(4-aminocyclohexyl)butane
2,2-bis(4-amino-3-methylcyclohexyl)ethane
2,2-bis(4-amino-3-methylcyclohexyl)propane
2,2-bis(4-amino-3,5-dimethylcyclohexyl)ethane
2,2-bis(4-amino-3,5-dimethylcyclohexyl)propane
2,2-bis(4-amino-3,5-dimethylcyclohexyl)butane
2,4-diaminodicyclohexylmethane
4-aminocyclohexyl-4-amino-3-methylcyclohexylmethane
4-amino-3,5-dimethylcyclohexyl-4-amino-3-methyl cyclohexylmethane and
2-(4-aminocyclohexyl)-2-(4-amino-3-methylcyclohexyl)-ethane.

Most of the above products exist in stereoisomeric form and any isomer ratio can be employed in the present invention.

Generally, the compositions of the subject invention have a OH to $NH_2$ equivalent ratio of from about 2:1 to 10:1 preferably from 3:1 to 5:1.

In a particularly preferred embodiment of the subject invention, the reactive composition comprises, based on 100 parts by weight, (a) from 58 to 79 parts of a polyalkylenepolyether polyol having equivalent weight of from 1650 to 2250; (b) from 20 to 40 parts of a graft polyol having an equivalent weight of from 1650 to 2250; and (c) from one to two parts of a reactive diamine having the formula as described above.

In preparing the polyurethane foams of the subject invention, any suitable organic polyisocyanate or mixture thereof can be employed. Representative organic polyisocyanate correspond to the following formula:

$$R''(NCO)_z$$

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-tri-phenylmethane triisocyanate, 2,4,6-toluene triisocyanates; the aromatic tetraisocyanates such as 4,4'-dimethyldiphenylmethane-2,2'-5,5'-tetraisocyanate, and the like; arylalkyl polyisocyanates such as xylylene diisocyanate; aliphatic polyisocyanates such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the useable isocyanates are the modifications of the above isocyanates which contain carbodiimide, allophonate or isocyanurate structures. Quasi-prepolymers may also be employed in the process of the subject invention. These quasi-prepolymers are prepared by reacting an excess of organic polyisocyanate or mixtures thereof with a minor amount of an active hydrogen-containing compound as determined by the well-known Zerewitinoff test, as described by Kohler in *Journal Of The American Chemical Society*, 49, 3181 (1927). These compounds and their methods of preparation are well known in the art. The use of any one specific active hydrogen compound is not critical hereto, rather any such compound can be employed herein. Generally, the quasi-prepolymers have a free isocyanate content of from 20% to 40% by weight.

The amount of organic polyisocyanate that is employed should generally be sufficient to provide about 0.9 to 1.2 isocyanate groups per hydroxyl plus amine group. In addition to the previously described ingredients other ingredients such as catalysts, surfactants, fillers, pigments and the like can be included in the preparation of the foams. Surfactants which can be used are the conventional surfactants used in urethane preparation such as the polysiloxanes or the alkylene oxide adducts of organic compounds containing reactive hydrogen atoms such as the ethylene oxide adducts of alcohols, glycols and phenols. Generally the surfactants are employed in amounts ranging from about 0.01 part to 5 parts by weight per 100 parts of polyol.

Conventional fillers for use herein includes for example aluminum silicate, calcium silicate, magnesium silicate, calcium carbonate, barium sulfate, calcium sulfate, glass fibers, carbon black and silica. The filler if used is normally present in an amount ranging from about 5 parts to 50 parts per weight per 100 parts of polyol.

A pigment which can be used herein can be any conventional pigment heretofor disclosed in the art such as titanium dioxide, zinc oxide, iron oxide, antimony oxide, chrome green, chrome yellow, iron blue siennas, molybdate oranges and organic pigments such as para reds, benzidine yellow, toluidine red, toners and phthalocyanines.

Conventional blowing agents such as water, halohydrocarbons, hydrocarbons and the like, can be employed herein in their conventional mode. Particularly preferred blowing agent for the preparation of high resilient polyurethane foams is water.

Any of the catalysts employed in the preparation of polyurethane foam can be employed in the subject invention. Representative of these catalysts include the tertiary amine catalysts such as diethylenetriamine, ketimine, tetramethylene diamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)dodecyl succinate, phenylmercuric benzoate, cadmium naphthenate, dibutyltin dilaurate and dibutyltin-di-2-ethylhexoate. Generally these catalysts will be employed in amounts ranging from about 0.01 part to 7.5 parts by weight based on the weight of the polyol.

In preparing the foams of the present invention, any general procedure conventionally utilized for the preparation of urethane foams can be practiced. Generally speaking, such procedure entails the mixing together of ingredients with agitation until the foaming reaction commences. After foam formation ceases, the resulting product is then cured at a temperature ranging from about 25° C. to 150° C. for about 5 minutes to 24 hours.

For more complete understanding of the present invention, reference is made to the following non-limiting examples wherein all parts are by weight unless otherwise noted. In the examples which follow, the following abbreviations are employed:

MDI—crude diphenylmethanediisocyanate,
TDI—a mixture of 2,4- and 2,6-toluene-diisocyanate, (80/20 by weight)
Polyol A—a graft polyol having a hydroxyl number of 26 prepared by the in situ polymerization of 12 weight percent styrene, 8 weight percent acrylonitrile, and 80 weight percent of a polyol containing unsaturation, said polyol having a hydroxyl number of 33 and prepared by capping with ethylene oxide a heteric adduct of a mixture of propylene oxide and allylglycidylether with glycerine and propylene glycol
Polyol B—a polyol prepared by the reaction of ethylene oxide with the propylene oxide adduct of glycerine, said polyol having a hydroxyl number of 35 and an ethylene oxide content of 14 percent by weight
Polyol C—a polyol prepared by the reaction of ethylene oxide with the propylene oxide adduct of trimetholpropane, said polyol having a hydroxyl number of 35 and an ethylene oxide content of 13 percent by weight
Diamine I—bis(4-aminocyclohexyl)methane, trans-trans isomers (18%–22%); cis-cis isomers (14%–16%); cis-trans isomers (60%–64%)
Diamine II—bis(4-aminocyclohexyl)methane, trans-trans isomers (44%–49%), cis-cis isomers (8%–10%); cis-trans isomers (39%–43%)
Diamine III—2,2-bis(4-aminocyclohexyl)propane
Diamine IV—bis(4-amino-3-methylcyclohexyl)methane
Diamine V—2,4'-diaminodicyclohexylmethane
DBTM—dibutyltin mercaptide
TA—tertiary amine catalyst commercially available as THANCAT DM-70

DAE—70% bis(2-dimethylaminoethyl)ether in dipropylene glycol
TED—33% triethylenediamine in dipropylene glycol
SS—Silicone surfactant The physical properties of the polyurethane foam prepared in the following examples were determined in accordance with the following test methods: —flame retardance—Motor Vehicle Safety Standard No. 302; physical properties—ASTM D-2406.

EXAMPLES I-IX

A series of reactive polyol compositions was prepared by blending various diamines and polyols. The specific ingredients employed and amounts thereof are presented in Table I below.

TABLE I

| Example | Polyol | Parts | Diamine | Parts |
|---------|--------|-------|---------|-------|
| I       | C      | 68.5  | I       | 1.5   |
|         | A      | 30.0  |         |       |
| II      | C      | 68.5  | II      | 1.5   |
|         | A      | 30.0  |         |       |
| III     | B      | 68.5  | I       | 1.5   |
|         | A      | 30.0  |         |       |
| IV      | B      | 68.5  | II      | 1.5   |
|         | A      | 30.0  |         |       |
| V       | B      | 68.3  | III     | 1.7   |
|         | A      | 30.0  |         |       |
| VI      | C      | 67.2  | IV      | 2.8   |
|         | A      | 30.0  |         |       |
| VII     | C      | 67.2  | III     | 2.8   |
|         | A      | 30.0  |         |       |
| VIII    | C      | 68.5  | V       | 1.5   |
|         | A      | 30.0  |         |       |
| IX      | C      | 69.2  | I       | 0.8   |
|         | A      | 30.0  |         |       |

EXAMPLES X-XVI

A series of polyurethane foams was prepared employing the compositions of the previous Examples along with various organic polyisocyanates, catalysts, blowing agents and surfactants. In addition to 100 parts by weight of the compositions of Examples I-VII, each formulation comprised the following ingredients and amounts thereof:

| Ingredient | Parts by Weight |
|------------|-----------------|
| Water      | 2.5             |
| SS         | 0.77            |
| TED        | 0.21            |
| DBTM       | 0.01            |
| DAE        | 0.08            |
| TA         | 0.33            |
| TDI        | 30.0            |
| MDI        | 3.3             |

The physical properties of the resulting foams are presented in Table II below.

TABLE II

| | Physical Properties of Polyurethane Foams | | | | | | |
|---|---|---|---|---|---|---|---|
| | X | XI | XII | XIII | XIV | XV | XVI |
| Density, pcf. | 2.54 | 2.51 | 2.51 | 2.57 | 2.53 | 2.60 | 2.63 |
| Tensile, psi. | 22.8 | 20.4 | 20.7 | 20.7 | 23.0 | 20.0 | 21.1 |
| Tear, pi. | 2.6 | 3.0 | 2.8 | 2.9 | 2.7 | 2.5 | 2.6 |
| Elongation, % | 191 | 206 | 191 | 194 | 197 | 194 | 216 |
| Resilience, % | 61.3 | 57.3 | 67.3 | 69.3 | 64.0 | 56.7 | 57.3 |
| ILD, lb./50 sq.in. | | | | | | | |
| Thickness, inches | 4.05 | 4.06 | 4.06 | 4.03 | 4.11 | 4.11 | 4.10 |
| 25% | 36.9 | 32.1 | 30.2 | 28.4 | 33.5 | 35.8 | 33.8 |
| 65% | 103.9 | 94.4 | 84.1 | 83.1 | 95.0 | 96.1 | 90.2 |
| Sag Factor | 2.81 | 2.94 | 2.79 | 2.92 | 2.69 | 2.68 | 2.67 |
| Guide factor | 14.5 | 12.8 | 12.0 | 11.0 | 14.0 | 13.8 | 12.9 |
| Recovery, % | 82.6 | 82.4 | 82.8 | 82.4 | 80.9 | 81.6 | 82.5 |
| Compression set, % | | | | | | | |
| 50% | 5.9 | 6.6 | 7.6 | 8.2 | 8.1 | 9.6 | 9.1 |
| 75% | 1.9 | 4.7 | 6.9 | 6.9 | 6.6 | 7.8 | 8.1 |
| Foam of Example | | | | | | | |
| 90% | 6.7 | 8.2 | 7.1 | 6.8 | 7.4 | 8.3 | 8.2 |
| Humid aged 5 hrs. at 250° F. | | | | | | | |
| % of original, 50% CLD | 66.9 | 67.1 | 74.2 | 70.3 | 69.1 | 76.1 | 77.6 |
| Compression set, % | | | | | | | |
| 50% | 16.1 | 17.6 | 20.3 | 21.6 | 21.7 | 15.9 | 15.6 |
| 75% | 20.2 | 18.7 | 35.3 | 29.5 | 36.6 | 27.7 | 27.7 |
| 90% | 39.6 | 40.6 | 55.9 | 56.7 | 49.1 | 35.5 | 46.5 |
| Heat aged 22 hrs. at 284° F. | | | | | | | |
| % of original tensile | 103 | 106 | 100 | 94 | 92.6 | 115 | 110 |
| Air flow, cfm. at 0.5" water | 1.95 | 2.11 | 1.65 | 1.77 | 1.1 | 1.04 | 1.16 |
| MVSS No. 302 Flame Test | | | | | | | |
| No. of samples | 3 | 3 | 3 | 3 | 3 | 3 | 3 |
| avg. burn time, sec. | 26.6 | 25.9 | 17.5 | 20.0 | 18.4 | 17.2 | 15.1 |
| avg. burn length, in. | 1.3 | 1.23 | 0.7 | 0.87 | 0.77 | 0.7 | 0.6 |

EXAMPLE XVII

Two polyurethane foams were prepared to illustrate the improved strength properties, load bearing and processing characteristics of the high resilient foams of the subject invention. The foams were prepared by pouring various formulations into metal molds. The formulations employed, conditions of the preparation and physical properties of the resulting foams are presented in Tables III and IV below.

TABLE III

| Formulation | A | B |
|-------------|---|---|
| Reactive Composition of Ex. | 100* | I-100 |
| Water | 2.5 | 2.5 |
| TED | 0.1 | 0.07 |

TABLE III-continued

| Formulation | A | B |
|---|---|---|
| DAE | 0.12 | 0.08 |
| TA | 0.30 | 0.33 |
| SS | 1.2 | 0.77 |
| DBTM | 0.03 | 0.01 |
| TDI | 26.2 | 27.3 |
| MDI | 6.6 | 6.8 |
| NCO Index | 103 | 103 |
| Conditions | | |
| Component temperature, °F. | 75 | 75 |
| In mold cure time, min. | 15 | 15 |
| oven temperature, °F. | 300 | 300 |
| Initial mold temp., °F. | 120 | 120 |
| Output rate, lb./min. | 28 | 28 |
| Shot time, seconds | 3.3 | 3.3 |
| Nominal pad weight, grams | 670 | 680 |
| Demold temperature, °F. | 165 | 170 |
| Free Rise Time, seconds | 135 | 135 |

*In this formulation 100 parts of a mixture comprising 70 parts of Polyol C and 30 parts of Polyol A was employed as the polyol component.

TABLE IV

Physical Properties of Polyurethane Foams

| | A | B |
|---|---|---|
| Density, pcf. | 2.55 | 2.65 |
| Tensile, psi. | 15.4 | 17.0 |
| Tear pi. | 1.7 | 1.9 |
| Elongation, % | 139 | 131 |
| ILD, lb./50 sq.in. | | |
| thickness, inches | 4.06 | 4.06 |
| 25% | 23.9 | 26.1 |
| 65% | 71.5 | 79.9 |
| Sag factor | 2.99 | 3.07 |
| Guide factor | 9.4 | 9.8 |
| Recovery, % | 83.1 | 83.5 |
| Compression set, % | | |
| 50% | 7.3 | 5.6 |
| 75% | 5.6 | 4.5 |
| 90% | 6.1 | 5.6 |
| Humid aged 5 hrs. at 250° F. | | |
| % of original, 50% CLD | 57.5 | 72.5 |
| Compression set, % | | |
| 50% | 18.0 | 18.6 |
| 75% | 21.5 | 23.7 |
| 90% | 65.4 | 55.7 |
| Heat aged 22 hrs. at 284° F. | | |
| % of original tensile | 90.9 | 95.3 |
| MVSS No. 302 Flame Test | | |
| No. of samples | 3 | 3 |
| avg. burn time, sec. | 11.5 | 10.8 |
| avg. burn length, in. | 0.5 | 0.38 |

EXAMPLE XVIII

Two foams were prepared by pouring a foaming formulation into a free-rise box. In one formulation, A, a blend of 30 parts of Polyol A and 70 parts of Polyol C was employed. In the other formulation, B, 100 parts of the composition of Example I was employed. The other ingredients employed and amounts thereof are presented in Table V below. As the data indicates, the foam prepared without the amine collapsed at 82 seconds whereas a stable foam was obtained through use of the compositions of the subject invention.

The above example was duplicated with the exception that the formulation was poured into molds. Substantially identical results were obtained.

Table V

| Formulation | A | B |
|---|---|---|
| Polyol Component | 70 C / 30 A | 100 |
| Water | 2.7 | 2.7 |
| SS | 0.77 | 0.77 |
| TA | 0.3 | 0.3 |
| TED | 0.07 | 0.07 |
| DAE | 0.08 | 0.08 |
| DBTM | 0.01 | 0.01 |
| TDI (105 Index) | 32.6 | 33.3 |
| Reactivity, sec. | | |
| Mix. Time | 8 | 6 |
| Cream Time | <8 | <6 |
| Rise Time | collapse at 82 | 115 |

EXAMPLE XIX

A series of slab-stock foams was prepared. The first foam (A) was prepared employing a polyol component and TDI as the organic polyisocyanate. In the second and third foams, (B & C) a reactive composition of the subject invention was employed in lieu of the polyol. In the fourth and fifth foams, (D & E) a mixture of isocyanates was employed. Details of the preparations are presented in Table VI below. As the data indicate, the foams based on TDI gave better overall properties insofar as load bearing and strength are concerned.

Table VI

| | A | B | C | D | E |
|---|---|---|---|---|---|
| Formulation | | | | | |
| Composition of Example | 70 C / 30 A | IX-100 | IX-100 | I-100 | I-100 |
| Water | 2.7 | 2.7 | 2.7 | 2.7 | 2.7 |
| SS | 0.77 | 0.77 | 0.77 | 0.77 | 0.77 |
| TED | 0.07 | 0.07 | 0.07 | 0.07 | 0.07 |
| DAE | 0.08 | 0.08 | 0.08 | 0.08 | 0.08 |
| TA | 0.3 | 0.3 | 0.3 | 0.3 | 0.3 |
| TDI (105 Index) | 32.6 | 33.3 | 33.3 | 29.8 | 29.8 |
| MDI | — | — | — | 3.5 | 3.5 |
| Physical Properties | | | | | |
| Density, pcf. | | 4.05 | 4.41 | 4.05 | 4.17 |
| ILD, lb./1 sq. in. | | | | | |
| thickness (inches) | | 2.00 | 2.00 | 2.00 | 2.00 |
| 25% | | 7.1 | 7.6 | 5.0 | 6.1 |
| 65% | | 23.0 | 26.2 | 17.4 | 19.5 |
| 25% return | | 3.5 | 4.1 | 2.4 | 3.2 |
| Sag Factor | | 3.24 | 3.45 | 3.48 | 3.20 |
| Guide Factor | | 1.8 | 1.7 | 1.2 | 1.5 |
| Recovery, % | Foam Collapsed | 49.3 | 53.9 | 48.0 | 52.5 |
| Compression set, % | | | | | |
| 50% | | 15.3 | 13.4 | 20.0 | 18.0 |
| 90% | | 17.3 | 16.6 | 19.1 | 17.2 |
| Humid aged 5 hours at 259° F. | | | | | |
| CLD, percent of original | | | | | |
| 50% | | 64.8 | 61.7 | 72.8 | 68.6 |
| Compression set, % | | | | | |
| 50% | | 10.9 | 12.2 | 17.6 | 17.6 |
| 90% | | 9.0 | 8.7 | 13.7 | 12.8 |

The embodiments of the invention in which an exclusive property or privilege is claimed are defined as follows:

1. A polyurethane foam composition obtained by the reaction, in the presence of a blowing agent, of an organic polyisocyanate with a reactive polyol composition comprising (a) a polyol having an equivalent weight of from 500 to 5000 and a functionality of from 2 to 4 and (b) from 0.5 percent to 5.0 percent by weight based on the weight of the polyol of a reactive diamine of the formula:

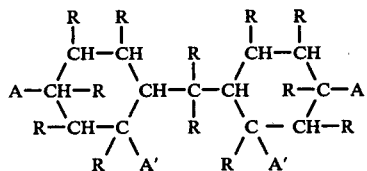

wherein R is H or alkyl of 1 to 4 carbon atoms and A and A' are NH₂ or H with the provisos that in each ring either A or A' is NH₂, not both and when A or A' is NH₂ then the R attached to that carbon atom is H.

2. A polyurethane foam composition obtained by the reaction, in the presence of a blowing agent, of an organic polyisocyanate with a reactive polyol composition comprising, based on 100 parts of said composition, (a) from 58 parts to 79 parts of a polyalkylene polyether polyol having an equivalent weight of from 1660 to 2250, (b) from 20 parts to 40 parts of a graft polyol having an equivalent weight of from 1650 to 2250, and (c) from 1 part to 2 parts of a reactive diamine having the formula:

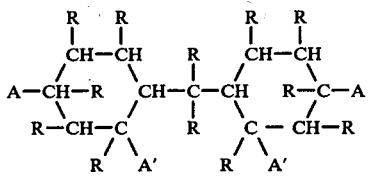

wherein R is H or alkyl of 1 to 4 carbon atoms and A and A' are NH₂ or H with the provisos that in each ring either A or A' is NH₂, not both and when A or A' is NH₂ then the R attached to that carbon atom is H.

3. The foam of claim 1 wherein the diamine is a mixture of stereo isomers of bis(4-aminocyclohexyl)methane.

4. The foam of claim 1 wherein the diamine is 2,2-bis(4-aminocyclohexyl)propane.

5. The foam of claim 1 wherein the diamine is bis(4-amino-3-methylcyclohexyl)methane.

6. The foam of claim 1 wherein the diamine is 2,4'-diaminocyclohexylmethane.

7. The foam of claim 1 wherein the organic polyisocyanate is toluene diisocyanate, diphenylmethane diisocyanate or mixtures thereof.

8. The foam of claim 2 wherein the diamine is a mixture of stereo isomers of bis(4-aminocyclohexyl)methane.

9. The foam of claim 2 wherein the diamine is 2,2-bis(4-aminocyclohexyl)propane.

10. The foam of claim 2 wherein the diamine is bis(4-amino-3-methylcyclohexyl)methane.

11. The foam of claim 2 wherein the diamine is 2,4'-diaminocyclohexylmethane.

12. The foam of claim 2 wherein the organic polyisocyanate is toluene diisocyanate, diphenylmethane diisocyanate or mixtures thereof.

* * * * *